(12) United States Patent
Pechanek et al.

(10) Patent No.: US 8,397,000 B2
(45) Date of Patent: Mar. 12, 2013

(54) SYSTEM CORE FOR TRANSFERRING DATA BETWEEN AN EXTERNAL DEVICE AND MEMORY

(75) Inventors: Gerald George Pechanek, Cary, NC (US); David Strube, Raleigh, NC (US); Edwin Franklin Barry, Vilas, NC (US); Charles W. Kurak, Jr., Durham, NC (US); Carl Donald Busboom, Cary, NC (US); Dale Edward Schneider, Durham, NC (US); Nikos P. Pitsianis, Durham, NC (US); Grayson Morris, Eindhoven (NE); Edward A. Wolff, Stockton, CA (US); Patrick R. Marchand, Apex, NC (US); Ricardo E. Rodriguez, Raleigh, NC (US); Marco C. Jacobs, Einhoven (NL)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/611,969

(22) Filed: Sep. 12, 2012

(65) Prior Publication Data

US 2013/0007331 A1    Jan. 3, 2013

Related U.S. Application Data

(63) Continuation of application No. 13/344,339, filed on Jan. 5, 2012, which is a continuation of application No. 13/106,042, filed on May 12, 2011, now Pat. No. 8,117,357, which is a continuation of application No. 11/827,548, filed on Jul. 12, 2007, now Pat. No. 7,962,667, which is a continuation of application No. 10/797,726, filed on Mar. 10, 2004, now Pat. No. 7,266,620, which is a continuation of application No. 09/599,980, filed on Jun. 22, 2000, now Pat. No. 6,748,517.

(60) Provisional application No. 60/140,425, filed on Jun. 22, 1999.

(51) Int. Cl.
*G06F 13/36* (2006.01)
*G06F 13/00* (2006.01)

(52) U.S. Cl. ............................. 710/33; 710/308; 712/24

(58) Field of Classification Search .............. 710/22–35, 710/308; 712/22–24
See application file for complete search history.

(56) References Cited

U.S. PATENT DOCUMENTS

| 6,446,191 | B1 * | 9/2002 | Pechanek et al. | 712/24 |
|---|---|---|---|---|
| 6,748,517 | B1 * | 6/2004 | Pechanek et al. | 712/200 |
| 7,181,730 | B2 * | 2/2007 | Pitsianis et al. | 717/132 |
| 7,266,620 | B1 * | 9/2007 | Pechanek et al. | 710/22 |
| 7,577,824 | B2 * | 8/2009 | Pechanek et al. | 712/205 |
| RE41,703 | E * | 9/2010 | Pechanek et al. | 712/24 |
| 2002/0019910 | A1 * | 2/2002 | Pitsianis et al. | 711/125 |
| 2009/0063724 | A1 * | 3/2009 | Pechanek et al. | 710/22 |
| 2011/0219210 | A1 * | 9/2011 | Pechanek et al. | 712/24 |
| 2012/0124335 | A1 * | 5/2012 | Pechanek et al. | 712/205 |

\* cited by examiner

*Primary Examiner* — Christopher B Shin
(74) *Attorney, Agent, or Firm* — Law Offices of Peter H, Priest, PLLC

(57) ABSTRACT

Details of a highly cost effective and efficient implementation of a manifold array (ManArray) architecture and instruction syntax for use therewith are described herein. Various aspects of this approach include the regularity of the syntax, the relative ease with which the instruction set can be represented in database form, the ready ability with which tools can be created, the ready generation of self-checking codes and parameterized test cases. Parameterizations can be fairly easily mapped and system maintenance is significantly simplified.

20 Claims, 3 Drawing Sheets

FIG. 2

```
                                    ⟵ 200 foreach instruction (add mpy sub) {
  # for each processor
  foreach p (s p) {
    # for each conditional execution
    foreach ce (e t. f.) {
      # for each unit that the instruction holds
      foreach unit (a m d) {
        # foreach testvector
        foreach columns in answerset {
          # generate test with these parameters
        }
      }
    }
  }
}
```

FIG. 3

```
                                              ⟵ 300 set instruction(MPY,FORMAT,1sw)      (RTE RX RY)
set instruction(MPY,FORMAT,1uw)      (RTE RX RY)
set instruction(MPY,FORMAT,2sh)      (RTE RX RY)
set instruction(MPY,FORMAT,2uh)      (RTE RX RY)
set instruction(MPY,RFACCESS)        ((WRITE) (READ) (READ))
set instruction(MPY,DATATYPES)       (1sw 1uw 2sh 2uh)
set instruction(MPY,DIFFDATATYPES)   ((1sw 1sd 1sw 1sw)(1uw 1ud 1uw 1uw)\
                                      (2sh 2sw 2sh 2sh)(2uh 2uw 2uh 2uh))
set instruction(MPY,PROCS)           (s p)
set instruction(MPY,UNITS)           (m)
set instruction(MPY,CE)              (e t.f.c n v z)
set instruction(MPY,CC)              (e)
set instruction(MPY,CCOMBO)          (e)
set instruction(MPY,SUFFIX)          (e)
set instruction(MPY,CYCLES)          2
```

```
#setting up state
set instruction(MPY,AS,RXb)    ((maxint)           (minint)                      }
set instruction(MPY,AS,RYb)    ((maxint)           (minint)                      }
set instruction(MPY,AS,Cb)     ((0)                (0)                           }
set instruction(MPY,AS,Vb)     ((0)                (0)                           }
set instruction(MPY,AS,Nb)     ((0)                (0)                           }
set instruction(MPY,AS,Zb)     ((0)                (0)                           } specifying desired state.
set instruction(MPY,AS,RTa)    ((mpexpr(maxint)*(maxint))  (mpexpr(minint)*(minint)) }
set instruction(MPY,AS,Ca)     ((0)                (0)                           }
set instruction(MPY,AS,Va)     ((0)                (0)                           }
set instruction(MPY,AS,Na)     ((sign0unsil)       (0)                           }
set instruction(MPY,AS,Za)     ((0)                (sign0unsil)                  }
```

SYSTEM CORE FOR TRANSFERRING DATA BETWEEN AN EXTERNAL DEVICE AND MEMORY

RELATED APPLICATIONS

The present application is a continuation of and claims the benefit of U.S. Ser. No. 13/344,339 filed Jan. 5, 2012 which is a continuation of and claims the benefit of and priority to U.S. Ser. No. 13/106,042 filed May 12, 2011 issued as U.S. Pat. No. 8,117,357 which is a continuation of and claims the benefit of and priority to U.S. Ser. No. 11/827,548 filed Jul. 12, 2007 issued as U.S. Pat. No. 7,962,667 which is a continuation of U.S. Ser. No. 10/797,726 filed Mar. 10, 2004 issued as U.S. Pat. No. 7,266,620 which is a continuation of U.S. Ser. No. 09/599,980 filed Jun. 22, 2000 issued as U.S. Pat. No. 6,748,517 which claims the benefit of U.S. Provisional Application Ser. No. 60/140,425 filed Jun. 22, 1999 all of which are incorporated herein by reference in their entirety.

FIELD OF THE INVENTION

The present invention relates generally to improvements to parallel processing, and more particularly to such processing in the framework of a ManArray architecture and instruction syntax.

BACKGROUND OF THE INVENTION

A wide variety of sequential and parallel processing architectures and instruction sets are presently existing. An ongoing need for faster and more efficient processing arrangements has been a driving force for design change in such prior art systems. One response to these needs have been the first implementations of the ManArray architecture. Even this revolutionary architecture faces ongoing demands for constant improvement.

SUMMARY OF THE INVENTION

To this end, the present invention addresses a host of improved aspects of this architecture and a presently preferred instruction set for a variety of implementations of this architecture as described in greater detail below. Among the advantages of the improved ManArray architecture and instruction set described herein are that the instruction syntax is regular. Because of this regularity, it is relatively easy to construct a database for the instruction set. With the regular syntax and with the instruction set represented in database form, developers can readily create tools, such as assemblers, disassemblers, simulators or test case generators using the instruction database. Another aspect of the present invention is that the syntax allows for the generation of self-checking codes from parameterized test vectors. As addressed further below, parameterized test case generation greatly simplifies maintenance. It is also advantageous that parameterization can be fairly easily mapped.

These and other features, aspects and advantages of the invention will be apparent to those skilled in the art from the following detailed description taken together with the accompanying drawings.

BRIEF DESCRIPTION OF THE DRAWINGS

FIG. 2 illustrates an exemplary test case generator program in accordance with the present invention;

FIG. 3 illustrates an entry from an instruction-description data structure for a multiply instruction (MPY); and FIG. 4 illustrates an entry from an MAU-answer set for the MPY instruction.

DETAILED DESCRIPTION

Figure 1:
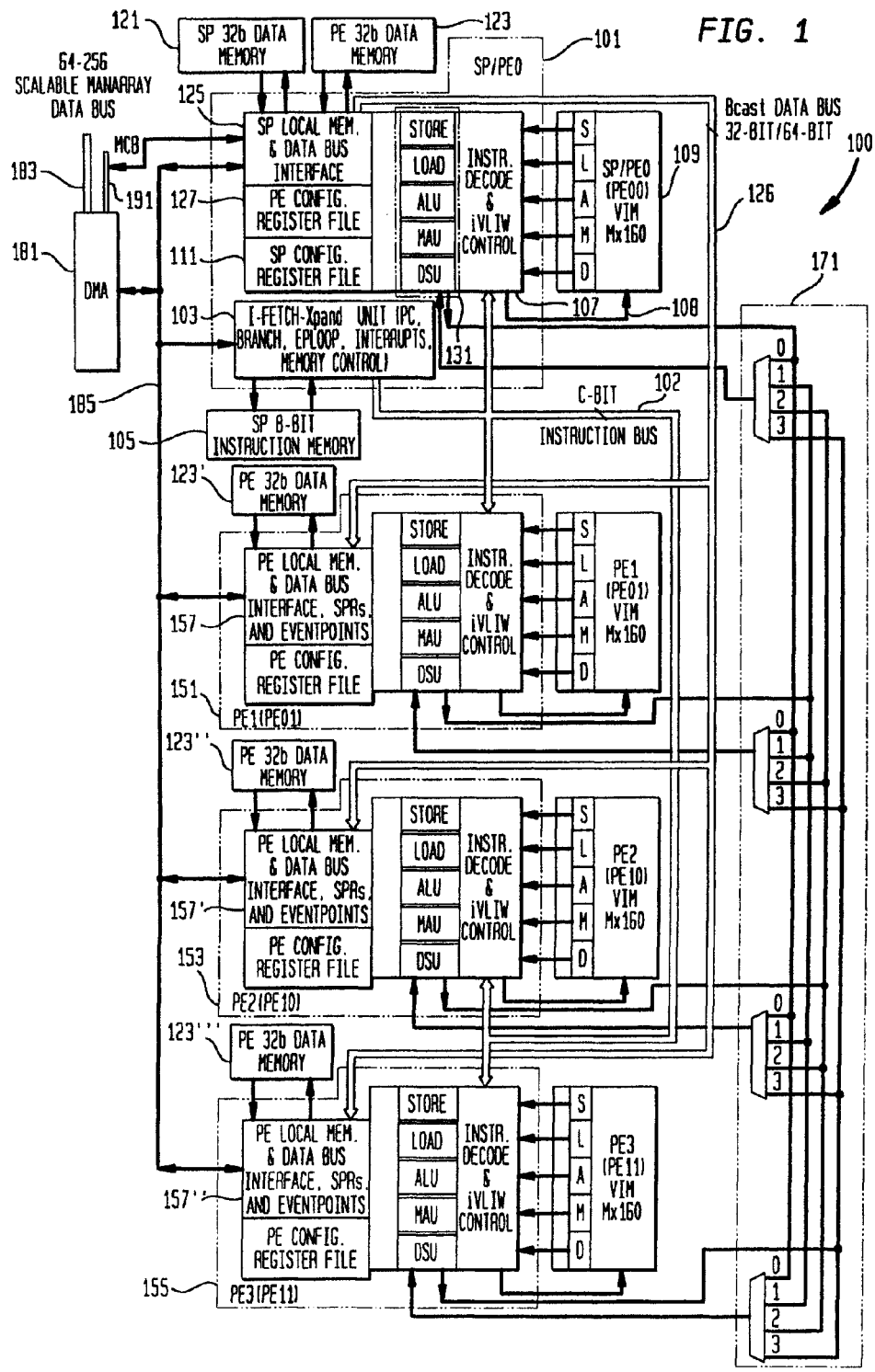
FIG. 1 illustrates an exemplary ManArray 2×2 iVLIW processor showing the connections of a plurality of processing elements connected in an array topology for implementing the architecture and instruction syntax of the present invention.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, U.S. patent application Ser. No. 09/169,255 filed Oct. 9, 1998, U.S. patent application Ser. No. 09/169,256 filed Oct. 9, 1998, U.S. patent application Ser. No. 09/169,072 filed Oct. 9, 1998, U.S. patent application Ser. No. 09/187,539 filed Nov. 6, 1998, U.S. patent application Ser. No. 09/205,558 filed Dec. 4, 1998, U.S. patent application Ser. No. 09/215,081 filed Dec. 18, 1998, U.S. patent application Ser. No. 09/228,374 filed Jan. 12, 1999 and entitled "Methods and Apparatus to Dynamically Reconfigure the Instruction Pipeline of an Indirect Very Long Instruction Word Scalable Processor", U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999 entitled "Methods and Apparatus for Abbreviated Instruction and Configurable Processor Architecture", U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999 entitled "Methods and Apparatus for Providing Direct Memory Access Control", U.S. patent application Ser. No. 09/596,103 entitled "Methods and Apparatus for Data Dependent Address Operations and Efficient Variable Length Code Decoding in a VLIW Processor" filed Jun. 16, 2000, U.S. patent application Ser. No. 09/598,566 entitled "Methods and Apparatus for Generalized Event Detection and Action specification in a Processor" filed Jun. 21, 2000, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 entitled "Methods and Apparatus for Initiating and Resynchronizing Multi-Cycle SIMD Instructions" filed Jun. 21, 2000, U.S. patent application Ser. No. 09/598,558 entitled "Methods and Apparatus for Providing Manifold Array (ManArray) Program Context Switch with Array Reconfiguration Control" filed Jun. 21, 2000, and U.S. patent application Ser. No. 09/598,084 entitled "Methods and Apparatus for Establishing Port Priority Functions in a VLIW Processor" filed Jun. 21, 2000, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, and Provisional Application Ser. No. 60/171,911 entitled "Methods and Apparatus for DMA Loading of Very Long Instruction Word Memory" filed Dec. 23, 1999, Provisional Application Ser. No. 60/184,668 entitled "Methods and Apparatus for Providing Bit-Reversal and Multicast Functions Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, Provisional Application Ser. No. 60/203,629 entitled "Methods and Apparatus for Power Control in a Scalable Array of Processor Elements" filed May 12, 2000, and Provisional Application Ser. No. 60/212,987 entitled "Methods and Apparatus for Indirect VLIW Memory Allocation" filed Jun. 21, 2000, respectively, all of which are assigned to the assignee of the present invention and incorporated by reference herein in their entirety.

All of the above noted patents and applications, as well as any noted below, are assigned to the assignee of the present invention and incorporated herein in their entirety.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs, 151, 153, and 155 are also utilized to demonstrate improved parallel array processing with a simple programming model in accordance with the present invention. It is noted that the PEs can be also labeled with their matrix positions as shown in parentheses for PE0 (PE00) 101, PE1 (PE01) 151, PE2 (PE10) 153, and PE3 (PE11) 155, The SP/PE0 101 contains a fetch controller 103 to allow the fetching of short instruction words (SIWs) from a B=32-bit instruction memory 105. The fetch controller 103 provides the typical functions needed in a programmable processor such as a program counter (PC), branch capability, digital signal processing eventpoint loop operations, support for interrupts, and also provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 more completely described in U.S. Pat. No. 6,023,753 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

Turning now to specific details of the ManArray architecture, and instruction syntax as adapted by the present invention, this approach advantageously provides a variety of benefits. Among the benefits of the ManArray instruction syntax, as further described herein, is that first the instruction syntax is regular. Every instruction can be deciphered in up to four parts delimited by periods. The four parts are always in the same order which lends itself to easy parsing for automated tools. An example for a conditional execution (CE) instruction is shown below:

(CE). (NAME). (PROCESSOR/UNIT). (DATATYPE)

Below is a brief summary of the four parts of a ManArray instruction as described herein:

(1) Every instruction has an instruction name.

(2A) Instructions that support conditional execution forms may have a leading (T. or F.) or . . .

(2B) Arithmetic instructions may set a conditional execution state based on one of four flags (C=carry, N=sign, V=overflow, Z=zero).

(3A) Instructions that can be executed on both an SP and a PE or PEs specify the target processor via (.S or .P) designations. Instructions without an .S or .P designation are SP control instructions.

(3B) Arithmetic instructions always specify which unit or units that they execute on (A=ALU, M=MAU, D=DSU).

(3C) Load/Store instructions do not specify which unit (all load instructions begin with the letter 'L' and all stores with letter 'S'.

(4A) Arithmetic instructions (ALU, MAU, DSU) have data types to specify the number of parallel operations that the instruction performs (e.g., 1, 2, 4 or 8), the size of the data type (D=64 bit doubleword, W=32 bit word, H=16 bit halfword, B=8 bit byte, or FW=32 bit floating point) and optionally the sign of the operands (S=Signed, U=Unsigned).

(4B) Load/Store instructions have single data types (D=doubleword, W=word, H1=high halfword, H0=low halfword, B0=byte0).

The above parts are illustrated for an exemplary instruction below:

| set instruction(ADD,CE) | {e t. f. c n v z} |
| set instruction(ADD,PROCS) | {s p} |
| set instruction(ADD,UNITS) | {a m} |
| set instruction(ADD,DATATYPES) | {1d 1w 2w 2h 4h 4b 8b} |
| set instruction(ADD,FORMAT,1d) | {RTE RXE RYE} |
| set instruction(ADD,FORMAT,1w) | {RT RX RY} |
| set instruction(ADD,FORMAT,2w) | {RTE RXE RYE} |
| set instruction(ADD,FORMAT,2h) | {RT RX RY} |
| set instruction(ADD,FORMAT,4h) | {RTE RXE RYE} |
| set instruction(ADD,FORMAT,4b) | {RT RX RY} |
| set instruction(ADD,FORMAT,8b) | {RTE RXE RYE} |

The example above only demonstrates the instruction syntax. Other entries in each instruction record include the number of cycles the instruction takes to execute (CYCLES), encoding tables for each field in the instruction (ENCODING) and configuration information (CONFIG) for subsetting the instruction set. Configuration information (1×1, 1×2, etc.) can be expressed with evaluations in the database entries:

```
proc Manta { } {
# are we generating for Manta?
return 1
# are we generating for ManArray?
# return 0
}
set instruction(MPY,CE) [Manta]? {e t. f.}: {e t. f. c n v z}
```

Having the instruction set defined with a regular syntax and represented in database form allows developers to create tools using the instruction database. Examples of tools that have been based on this layout are:

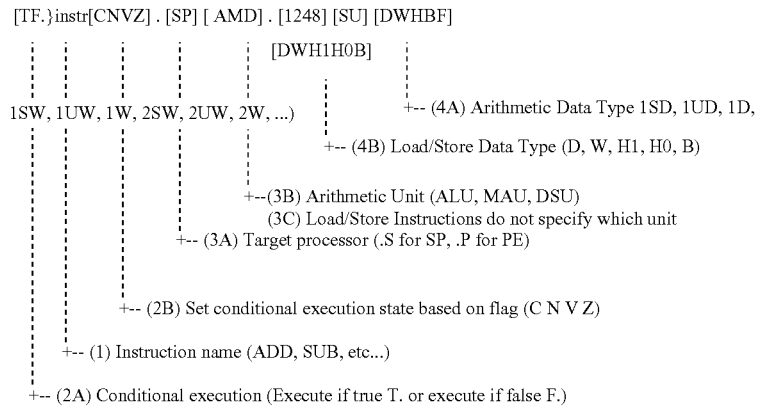

Second, because the instruction set syntax is regular, it is relatively easy to construct a database for the instruction set. The database is organized as instructions with each instruction record containing entries for conditional execution (CE), target processor (PROCS), unit (UNITS), datatypes (DATATYPES) and operands needed for each datatype (FORMAT). The example below using TcLsyntax, as further described in J. Ousterhout, Tcl and the Tk Toolkit, Addison-Wesley, ISBN 0-201-63337-X, 1994, compactly represents all 196 variations of the ADD instruction.

The 196 variations come from (CE)*(PROCS)*(UNITS)*(DATATYPES)=7*2*2*7=196. It is noted that the 'e' in the CE entry below is for unconditional execution.

Assembler (drives off of instruction set syntax in database),
Disassembler (table lookup of encoding in database),
Simulator (used database to generate master decode table for each possible form of instruction), and
Testcase Generators (used database to generate testcases for assembler and simulator).

Another aspect of the present invention is that the syntax of the instructions allows for the ready generation of self-checking code from test vectors parameterized over conditional execution/datatypes/sign-extension/etc. TCgen, a test case generator, and LSgen are exemplary programs that generate self-checking assembly programs that can be run through a Verilog simulator and C-simulator.

An outline of a TCgen program 200 in accordance with the present invention is shown in FIG. 2. Such programs can be used to test all instructions except for flow-control and iVLIW instructions. TCgen uses two data structures to accomplish this result. The first data structure defines instruction-set syntax (for which datatypes/ce[1,2,3]/sign extension/rounding/operands is the instruction defined) and semantics (how many cyles/does the instruction require to be executed, which operands are immediate operands, etc.). This data structure is called the instruction-description data structure.

An instruction-description data structure 300 for the multiply instruction (MPY) is shown in FIG. 3 which illustrates an actual entry out of the instruction-description for the multiply instruction (MPY) in which e stands for empty. The second data structure defines input and output state for each instruction. An actual entry out of the MAU-answer set for the MPY instruction 400 is shown in FIG. 4. State can contain functions which are context sensitive upon evaluation. For instance, when defining an MPY test vector, one can define: $RX_b$ (RX before)=maxint, $RY_b$ (RY before)=maxint, $RT_a$=maxint*maxint. When TCgen is generating an unsigned word form of the MPY instruction, the maxint would evaluate to 0xffffffff. When generating an unsigned halfword form, however, it would evaluate to 0xffff. This way the test vectors are parameterized over all possible instruction variations. Multiple test vectors are used to set up and check state for packed data type instructions.

The code examples of FIGS. 3 and 4 are in Tel syntax, but are fairly easy to read. "Set" is an assignment, ( ) are used for array indices and the { } are used for defining lists. The only functions used in FIG. 4 are "maxint", "minint", "sign0unsi1", "sign1unsi0", and an arbitrary arithmetic expression evaluator (mpexpr). Many more such functions are described herein below.

TCgen generates about 80 tests for these 4 entries, which is equivalent to about 3000 lines of assembly code. It would take a long time to generate such code by hand. Also, parameterized testcase generation greatly simplifies maintenance. Instead of having to maintain 3000 lines of assembly code, one only needs to maintain the above defined vectors. If an instruction description changes, that change can be easily made in the instruction-description file. A configuration dependent instruction-set definition can be readily established. For instance, only having word instructions for the ManArray, or fixed point on an SP only, can be fairly easily specified.

Test generation over database entries can also be easily subset. Specifying "SUBSET(DATATYPES) {1sw 1sh}" would only generate testcases with one signed word and one signed halfword instruction forms. For the multiply instruction (MPY), this means that the unsigned word and unsigned halfword forms are not generated. The testcase generators TelRita and TelRitaCorita are tools that generate streams of random (albeit with certain patterns and biases) instructions. These instruction streams are used for verification purposes in a co-verification environment where state between a C-simulator and a Verilog simulator is compared on a per-cycle basis.

Utilizing the present invention, it is also relatively easy to map the parameterization over the test vectors to the instruction set since the instruction set is very consistent.

Further aspects of the present invention are addressed in the Manta User and Reference Information found in U.S. Pat. Nos. 6,748,517 and 7,266,620 at cols. 9-1050. That documentation is divided into the following principle sections:

| Section I | Table of Contents; |
|---|---|
| Section II | Programmer's User's Guide (PUG); |
| Section III | Programmer's Reference (PREF). |

The Programmer's User's Guide Section addresses the following major categories of material and provides extensive details thereon: (1) an architectural overview; (2) processor registers; (3) data types and alignment; (4) addressing modes; (5) scalable conditional execution (CE); (6) processing element (PE) masking; (7) indirect very long instruction words (iVLIWs); (8) looping; (9) data communication instructions; (10) instruction pipeline; and (11) extended precision accumulation operations.

The Programmer's Reference Section addresses the following major categories of material and provides extensive details thereof: (1) floating-point (FP) operations, saturation and overflow; (2) saturated arithmetic; (3) complex multiplication and rounding; (4) key to instruction set; (5) instruction set; (6) instruction formats, as well as, instruction field definitions.

While the present invention has been disclosed in the context of various aspects of presently preferred embodiments, it will be recognized that the invention may be suitably applied to other environments and applications consistent with the claims which follow.

We claim:

1. A system core for transferring instructions to an array processor, the system core comprising:
   a controller sequence processor (SP) executing an installed array processor program;
   an SP instruction memory coupled to the SP, the SP instruction memory storing SP instructions and processing element (PE) instructions and coupled to a direct memory access (DMA) bus;
   a plurality of PEs coupled to the SP and configured in an array processor; and
   a DMA controller operating under control of a DMA processor executing DMA instructions, the DMA controller coupled to the DMA bus and a system data bus, wherein the DMA processor manages SP and PE instruction transfers between a device coupled to the system data bus and the SP instruction memory coupled to the DMA bus, the SP and PE instruction transfers across the DMA bus to the SP instruction memory occurring in parallel with the plurality of PEs executing a PE instruction distributed from the SP in response to the SP executing the installed array processor program.

2. The system core of claim 1, wherein the SP and PE instruction transfers between the device coupled to the system data bus and the SP instruction memory coupled to the DMA bus are based on an address space assigned to the SP instruction memory.

3. The system core of claim 1, wherein the SP instruction memory couples to the DMA bus through an SP instruction memory interface unit.

4. The system core of claim 3, wherein the SP instruction memory interface unit arbitrates between the coupled SP and the DMA controller for memory access, wherein the coupled SP has preference in case of conflicting accesses.

5. The system core of claim 1, wherein the PE instructions include one or more very long instruction words (VLIWs) stored in sequential accessible form in the SP instruction memory.

6. The system core of claim 1, wherein at least one PE executes a very long instruction word (VLIW) having at least one memory access instruction which when executed accesses data from a PE data memory coupled to the at least one PE.

7. The system core of claim 1, wherein the DMA processor is configured for fetching DMA instructions from an SP data memory coupled to the SP.

8. The system core of claim 1, wherein the DMA bus is comprised of two DMA lanes, wherein each DMA lane is controlled by its own lane controller.

9. The system core of claim 8, wherein each lane controller has its own DMA processor and each lane controller couples with the DMA bus and the system data bus.

10. The system core of claim 8, wherein each lane controller operates independently.

11. The system core of claim 8, wherein one DMA lane is set for outbound data transfers and the other DMA lane is set for inbound data transfers and outbound and inbound data transfers are selectable to operate in parallel.

12. A method for transferring array processor instructions, the method comprising:
configuring a system core according to direct memory access (DMA) transferred array processor instructions that control a plurality of processing elements (PEs) with each PE coupled to a PE data memory, the PE data memories coupled to a DMA bus, and a DMA controller coupled to the DMA bus and a system data bus;
receiving DMA instructions in a DMA controller from the DMA bus;
interpreting the DMA instructions by a DMA processor in the DMA controller; and
transferring the array processor instructions under control of the DMA processor according to the DMA instructions from an external device across the system data bus through the DMA controller across a DMA bus to a sequence processor (SP) instruction memory, wherein the SP instruction memory stores the array processor instructions to control operations in an SP and the plurality of processing elements (PEs) coupled to the SP.

13. The method of claim 12 further comprising:
accessing data from a PE data memory under control of its associated PE in parallel with the transferring of data to one or more of a plurality of PE data memories.

14. The method of claim 12 wherein the DMA instructions are used to synchronize a host processor with the transferring of the array processor instructions and data from the system data bus to one or more of the plurality of PE data memories, the host processor coupled to the system control bus.

15. The method of claim 12 further comprising:
arbitrating between the SP and the DMA controller in an SP instruction memory interface unit for memory access, wherein the SP has preference in case of conflicting accesses.

16. The method of claim 12 further comprising:
operating the DMA bus as a split transaction bus having two DMA lanes, wherein each DMA lane is controlled by its own lane controller.

17. A method of transferring a program to an array processor, the method comprising:
fetching direct memory access (DMA) instructions to a DMA processor in a DMA lane controller, wherein the DMA instructions as executed by the DMA processor operate the DMA lane controller to implement memory-to-memory transfers;
transferring array instructions of a first program according to the DMA instructions from a system memory to an array instruction memory, wherein the array instructions include control processor instructions and processing element (PE) instructions; and
fetching array instructions of a second program from the array instruction memory for dispatch to a control processor and a plurality of PEs in parallel with the transferring of the array instructions of the first program to the array instruction memory.

18. The method of claim 17 further comprising:
transferring the array instructions of the first program from the system memory across a system data bus to the DMA lane controller; and
transferring the array instructions of the first program from the DMA lane controller across a lane of a DMA bus to the array instruction memory.

19. The method of claim 18 further comprising:
transferring data from an array data memory across a second lane of the DMA bus to a second DMA lane controller; and
transferring the data from the second DMA lane controller across the system data bus to the system memory.

20. The method of claim 18 further comprising:
transferring data from a PE data memory coupled to a PE of the plurality of PEs across a second lane of the DMA bus to a second DMA lane controller; and
transferring the data from the second DMA lane controller across the system data bus to the system memory.

* * * * *